United States Patent [19]

Bauder

[11] Patent Number: 4,940,101
[45] Date of Patent: Jul. 10, 1990

[54] VENTING DEVICE FOR THE FUEL TANK OF A MOTOR VEHICLE

[75] Inventor: Armin Bauder, Neckarsulm, Fed. Rep. of Germany

[73] Assignee: AUDI AG, Fed. Rep. of Germany

[21] Appl. No.: 441,348

[22] Filed: Nov. 21, 1989

Related U.S. Application Data

[63] Continuation of Ser. No. 254,492, Oct. 6, 1988, abandoned.

[30] Foreign Application Priority Data

Oct. 12, 1987 [DE] Fed. Rep. of Germany ....... 3734414

[51] Int. Cl.$^5$ .................................. F02M 23/12
[52] U.S. Cl. .................... 180/69.4; 123/519
[58] Field of Search ............... 180/69.4, 69.5; 123/518, 519, 520, 521; 137/587, 588; 220/85 VR

[56] References Cited

FOREIGN PATENT DOCUMENTS 3346103 10/1986 Fed. Rep. of Germany .
178221 8/1986 Japan ................................... 180/69.4

Primary Examiner—Charles A. Marmor
Assistant Examiner—Michael Mar
Attorney, Agent, or Firm—Kane, Dalsimer, Sullivan, Kurucz, Levy, Eisele and Richard

[57] ABSTRACT

A venting device for the fuel tank of a motor vehicle has a venting line in which a fuel vapor filter is disposed. The filter is connected to the atmosphere through an aeration device, the outlet of which lies in the road region of the vehicle. To prevent an excessive vacuum arising in the venting system, when the outlet is plugged, a vacuum limiting valve is connected to the aeration line. This valve, at a particular vacuum in the aerating line, connects this line with the atmosphere at a place above the outlet of the aeration line.

2 Claims, 1 Drawing Sheet

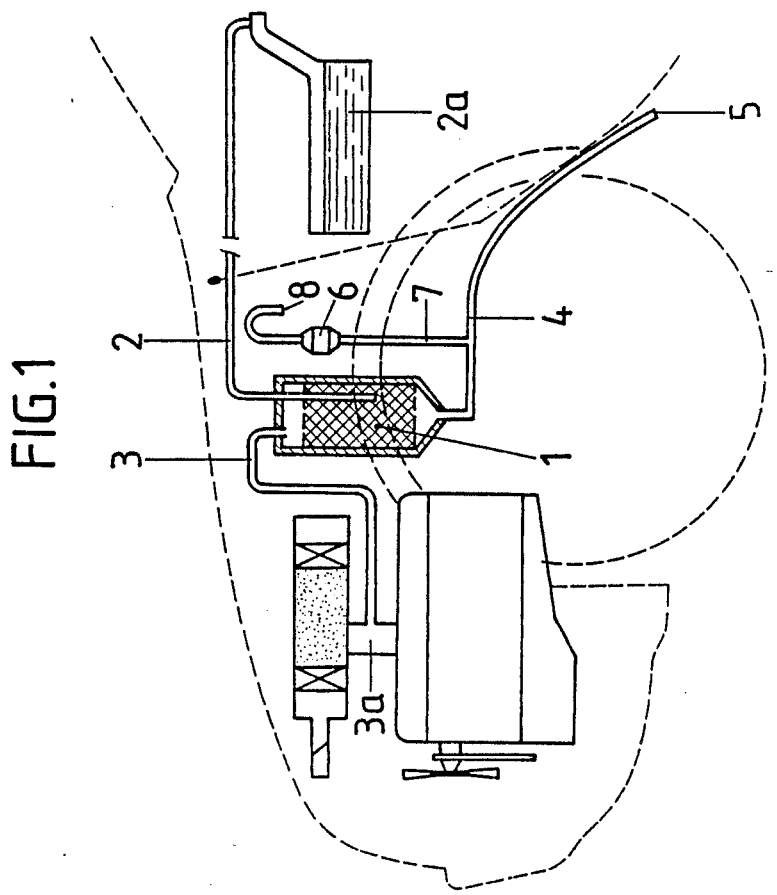
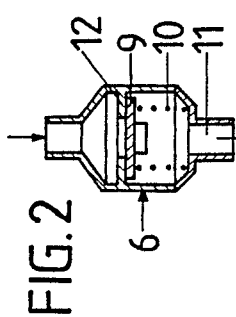
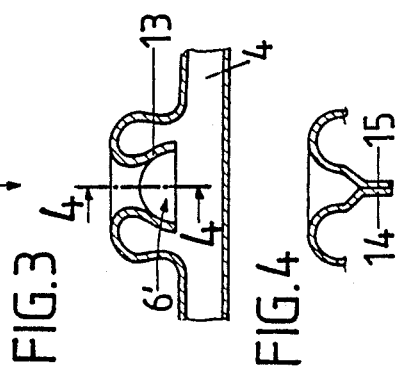
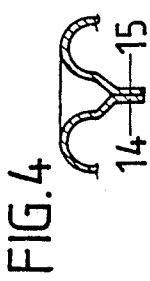
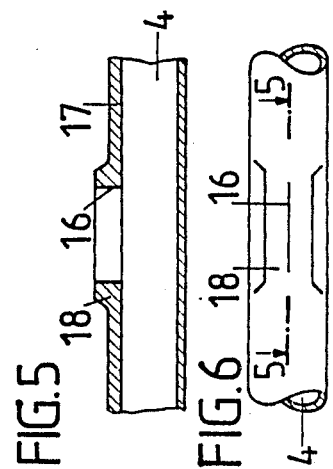

VENTING DEVICE FOR THE FUEL TANK OF A MOTOR VEHICLE

This is a continuation of co-pending application Ser. No. 254,492 filed on Oct. 6, 1988 now abandoned.

BACKGROUND OF THE INVENTION

The invention is directed to a venting device for the fuel tank of a motor vehicle. A known venting device is disclosed in DE-C 33 46 103. Absorption of the fuel in the fuel vapor filter, which normally consists of activated charcoal, is an exothermic process. It is therefore desirable that the coldest possible air be supplied to the filter for aeration. Consequently, the aeration line generally is laid so that it opens into the atmosphere outside the warm engine compartment, near the underside of the vehicle, so that relatively cool air is thus suctioned through the filter. However, this position of the outlet of the aeration line can entail problems. For instance, the outlet can be temporarily plugged by freezing liquid. In this case, the fuel vapor filter can implode due to action of the vacuum from the intake system of the internal combustion engine in the venting system.

SUMMARY OF THE INVENTION

It is an object of the invention to provide a venting device, with which the disadvantageous consequences, when the outlet of the aeration line is plugged or when the vehicle is driven through water, are avoided.

If a partial vacuum in the aeration line occurs with the venting device of the present invention because the outlet of the aeration line is plugged or because of a passage through water, and if this partial vacuum exceeds a certain value, a vacuum limiting valve opens automatically, and air can now be suctioned via the opened limiting valve through the fuel vapor filter. By these means, the above-described damaging effects of plugging the outlet of the aeration line in the known venting devices are avoided.

The vacuum limiting valve preferably is adjusted so as to ensure that, when driving through water, water cannot enter the fuel vapor filter. This is the case when the vacuum in the aeration line, at which the limiting valve opens, such as a vacuum equivalent to a 120 mm water column, is less than the vacuum necessary to raise water from the outlet of the aeration line as far as the filter.

Embodiments of the invention are described below with reference to the drawings.

BRIEF DESCRIPTION OF DRAWINGS

FIG. 1 shows a schematic representation of a venting device for the fuel tank of a motor vehicle, with a vacuum limiting valve connected to the aeration line of the fuel vapor filter.

FIG. 2 shows a section of the vacuum limiting valve of FIG. 1, on a larger scale.

FIG. 3 shows a partial longitudinal section of a aeration line with an integrated vacuum limiting valve.

FIG. 4 shows a section along line 4—4 of FIG. 3.

FIG. 5 shows a partial longitudinal section along line 5—5 of FIG. 6, of a aeration line with an integrated vacuum limiting valve in another embodiment.

FIG. 6 shows a top view of the line section of FIG. 5.

DETAILED DESCRIPTION

In FIG. 1, a fuel vapor filter 1 is connected by a line 2 with the fuel tank 2a of the motor vehicle, and by a line 3 with the intake system 3a of the internal combustion engine of the vehicle. In order to regenerate the filter material, an aeration line 4 is connected to the lower end of the filter 1. The outlet 5 of the aeration line 4 is situated in the road region of the motor vehicle, so as to insure that the coolest possible air will be suctioned through the filter 1. When the outlet 5 plugs up or when the outlet dips into water, through which the vehicle is passing, a high vacuum results in the filter 1 and in the aeration line 4, due to the vacuum created by the intake system 3a of the internal combustion engine. This vacuum can destroy the filter 1. To avoid this, a vacuum limiting valve 6 is connected to the aeration line 4. When a specified or preset vacuum in the aeration line 4 is exceeded, this valve opens automatically. Air can thus be suctioned through the filter 1 even if the outlet 5 is plugged up.

In the embodiment of FIG. 1, the vacuum limiting valve 6 is disposed in a line 7, which at first extend upwards from the aeration line 4 and then is bent downwards, so that its outlet 8 points downwards. This prevents entry of water into the line 7 when the engine compartment is being washed.

The vacuum limiting valve 6 is shown in FIG. 2 on a large scale and in section. It has a valve plate 9, which is acted upon by a spring 10 so as to close the valve. The connection 11 is connected with the aeration line 4. At a particular or preset vacuum in connection 11, this vacuum being defined by the force of the spring 10, the valve plate 9 is lifted from its valve seat 12, and thus opens up the passage.

FIGS. 3 and 4 show a vacuum limiting valve 6', which is integrated into the hose-shaped aeration line 4, which consists of an elastomeric material. This vacuum limiting valve 6' if formed by a branch 13 of the hose 4, the end of which is pressed flat and turned inward. As can be seen from FIG. 4, this creates two lips 14 and 15 which contact one another due to their inherent tension or elasticity or also due to a spring clip, which is not shown. However, the lips are pressed apart through the external air pressure when a particular or preset vacuum exists in the hose 4, so that the vacuum in the hose 4 is eliminated.

In the embodiment of FIGS. 5 and 6, the vacuum limiting valve is formed by a simple slit 16 in the wall 17 of the hose 4. This slit 16 is closed by the inherent elasticity of the material as long as the vacuum in the hose 4 does not exceed a certain value. At a higher vacuum, the slit 16 automatically opens under the action of atmospheric pressure, so that the vacuum in the hose 4 is brought to the permissible value. The slit 16 is made in a thickened section 18 of the wall 17. The level of the vacuum at which the slit 16 opens can be determined by appropriately choosing the thickness of this thickened section 18.

Thus, the aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A venting device for venting the fuel tank of a motor vehicle, comprising:

a fuel vapor filter connected by a first line to said fuel tank for collecting vapors and by a second line to the intake system of an internal combustion engine of the vehicle;

an aeration line connected to the lower end of said filter for aerating said filter, said aeration line extending downwardly to a location adjacent the road region of the vehicle and having an opening at it's lowermost end;

a vacuum limiting valve connected to said aeration line by a third line extending upwardly from said aeration lien to said valve; and an air intake line extending from said valve with an opening for admitting air therein when the vacuum limiting valve opens in response to clogging of the aeration line.

2. The venting device of claim 1 wherein said motor vehicle includes an engine compartment, and wherein said vacuum limiting valve is disposed in said engine compartment.

* * * * *